United States Patent
Tamura

(10) Patent No.: US 8,081,663 B2
(45) Date of Patent: Dec. 20, 2011

(54) TIME SYNCHRONIZATION METHOD AND RELAY APPARATUS

(75) Inventor: Yoshio Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 12/546,836

(22) Filed: Aug. 25, 2009

(65) Prior Publication Data

US 2010/0054244 A1    Mar. 4, 2010

(30) Foreign Application Priority Data

Sep. 2, 2008    (JP) ................................ 2008-224817

(51) Int. Cl.
*H04J 3/06* (2006.01)
(52) U.S. Cl. ........................ 370/503; 375/356
(58) Field of Classification Search .................. 370/252, 370/389, 503, 509, 516; 375/356
See application file for complete search history.

(56) References Cited

U.S. PATENT DOCUMENTS

| | | | | |
|---|---|---|---|---|
| 7,453,874 | B1* | 11/2008 | Nguyen | 370/389 |
| 2004/0246996 | A1* | 12/2004 | Engel | 370/508 |
| 2006/0129864 | A1* | 6/2006 | Kynast et al. | 713/375 |
| 2007/0008993 | A1 | 1/2007 | Cha et al. | |
| 2007/0147562 | A1* | 6/2007 | Eidson | 375/354 |
| 2007/0260906 | A1* | 11/2007 | Corredoura | 713/400 |
| 2008/0069150 | A1* | 3/2008 | Badt et al. | 370/503 |
| 2008/0175275 | A1* | 7/2008 | Garner et al. | 370/503 |
| 2010/0118721 | A1* | 5/2010 | Sakurada et al. | 370/252 |

FOREIGN PATENT DOCUMENTS

| | | |
|---|---|---|
| EP | 1 717 978 | 11/2006 |
| JP | 2007-20183 | 1/2007 |

OTHER PUBLICATIONS

European Search Report dated Mar. 29, 2011, from corresponding European Application No. 09 16 8715.
Sivaram Balasubramanian, et al. "Investigation of IEEE 1588 on Gigabit Ethernet, Priority Tagged Frames and Ethernet Daisy Chain" Proceedings of the IEEE-1588 Conference, Oct. 10, 2005.
George Gaderer, et al. "Extending IEEE 1588 to Fault Tolerant Clock Synchronization" Factory Communication Systems, 2004, Sep. 22, 2004, pp. 353-357.

* cited by examiner

*Primary Examiner* — Jung Park
(74) *Attorney, Agent, or Firm* — Katten Muchin Rosenman LLP

(57) ABSTRACT

A time synchronization method for synchronizing times of a first apparatus and a second apparatus includes transmitting, by the first apparatus, a packet to the second apparatus, the packet including the time of the first apparatus, providing, by a relay apparatus that relays the packet, a value to the packet, the value indicating a reception time upon the reception of the packet, providing, by the relay apparatus, a difference between the value provided to the packet in the providing of reception time and a current time to the packet upon the transmission of the packet, the difference serving as a delay value, and executing, by the second apparatus, a control for time synchronization based on the time of the first apparatus included in the packet and the delay value provided to the packet.

6 Claims, 15 Drawing Sheets

TIME SYNCHRONIZATION METHOD AND RELAY APPARATUS

CROSS-REFERENCE TO RELATED APPLICATIONS

This application is based upon and claims the benefit of priority of the prior Japanese Patent Application No. 2008-224817, filed on Sep. 2, 2008, the entire contents of which are incorporated herein by reference.

FIELD

The present invention relates to a time synchronization method and a relay apparatus, and for example, to a time synchronization method and a relay apparatus capable of realizing time synchronization even if a transmission time of packet changes.

BACKGROUND

A PTP (Precision Time Protocol) is known as a technique for synchronizing the times of a plurality of devices connected through a network with microsecond or better accuracy. The PTP is a protocol for realizing time synchronization by exchanging packets including time information between a master and a slave. The master is a device that manages a reference time, and the slave is a device that synchronizes the time of the slave with the time of the master.

An example of time synchronization by the PTP will be described with reference to FIG. 13. As illustrated in FIG. 13, the master uses a sync/follow_up message to notify the time of the master to the slave. After receiving the sync/follow_up message, the slave sets Time calculated by the following Expressions 1 and 2 as the time of the slave.

$$\text{offset} = TSx - TMx - \text{delay} \qquad \text{Expression 1}$$

$$\text{Time} = Ts - \text{offset} \qquad \text{Expression 2}$$

In this case, TMx denotes the time of the master notified by the sync/follow_up message. TSx denotes the time of the slave when the sync/follow_up message is received. Furthermore, delay denotes a transmission line delay, and 0 is set as an initial value. Ts denotes the current time of the slave.

In the example of FIG. 13, the time of the master notified to the slave by the sync/follow_up message is "10", and the time of the slave upon the notification is "110". Therefore, the slave sets the time of the slave to "10" at this point. Actually, there is a transmission line delay of "20" between the master and the slave. Therefore, the time set by the slave is delayed by "20" from the time of the master.

Subsequently, the slave transmits a delay_req message to the master to acquire the size of the transmission line delay between the master and the slave. After receiving the delay_req message, the master returns a delay_resp message, which includes the reception time of the delay_req message, to the slave. After receiving the delay_resp message, the slave sets a transmission line delay by the following Expression 3.

$$\text{delay} = ((TSx - TMx) + (TMy - TSy))/2 \qquad \text{Expression 3}$$

In this case, TSy denotes the time when the slave has transmitted the delay_req message to the master. TMy denotes the time when the master has received the delay_req message, and the slave acquires the time from the delay_resp message. Although TSx and TMx are the same as those in Expression 1, since the time of the slave is changed by the process, TSx is a value based on the changed time.

In the example of FIG. 13, the time that the slave has transmitted the delay_req message to the master is "50", and the time included in the delay_resp message is "90". Therefore, the slave sets delay to "20".

As the slave acquires the size of delay, the master uses a sync/follow_up message to notify the time of the master to the slave again. After receiving the sync/follow_up message, the slave sets Time calculated by Expressions 1 and 2 as the time of the slave.

In the example of FIG. 13, the time of the master notified to the slave by the second sync/follow_up message is "110". The time of the slave upon the notification is "110", and the value of delay is "20" at this point. Therefore, the slave sets the time of the slave to "130" at this point. After that point, the times of the master and the slave are synchronized as illustrated in FIG. 13.

The PTP is a UDP (User Datagram Protocol) based protocol. An example of a technique related to the PTP for realizing similar functions as the PTP in layer 2 level is also known (for example, Japanese Laid-open Patent Publication NO. 2007-20183).

However, the time synchronization by the PTP does not appropriately function in some network environments. More specifically, the time synchronization by the PTP is based on the assumption that the time required for the transmission of a packet from the master to the slave is the same as the time required for the transmission of a packet from the slave to the master. Therefore, the times cannot be accurately synchronized by the PTP in an environment where the times do not match.

One of the typical environments in which the transmission times of PTP packets do not match is an environment in which the master and the slave are connected through a relay apparatus such as a switching hub and a layer 3 switch. The relay apparatuses internally buffer the packets and output the packets based on a certain priority. Therefore, a jitter may occur to the transmission times of the packets depending on the communication conditions.

The transmission time of a packet will be described with a specific example. FIG. 14 is an example of an ideal communication environment. In the environment illustrated in FIG. 14, a delay A generated by buffering the sync/follow_up message, a delay B generated by buffering the delay_req message, and a delay C generated by buffering the delay_resp message match in the relay apparatus. In such an environment, the time synchronization by the PTP appropriately functions.

FIG. 15 is an example of a communication environment in which the transmission times of packets do not match. In the environment illustrated in FIG. 15, the delay C is longer than the delays A and B. The increase in the delay C occurs when, for example, a large number of packets are transmitted from another apparatus to the relay apparatus when the delay_resp message is transmitted. In this case, the delay of the sync/follow_up message transmitted from the master to the slave after the delay_resp message is also extended as illustrated in FIG. 16. Therefore, the time synchronization may fail.

SUMMARY

According to an aspect of the invention, a time synchronization method for synchronizing times of a first apparatus and a second apparatus includes transmitting, by the first apparatus, a packet to the second apparatus, the packet including the time of the first apparatus, providing, by a relay apparatus that relays the packet, a value to the packet, the value indicating a reception time upon the reception of the packet, providing, by the relay apparatus, a difference between the value provided to the packet in the providing of reception time and a current time to the packet upon the transmission of the packet, the difference serving as a delay value, and executing, by the second apparatus, a control for time synchronization based on the time of the first apparatus included in the packet and the delay value provided to the packet.

According to an aspect of the invention, a relay apparatus that relays a packet includes a counter that adds a value every certain time, a first port that receives a packet, a second port that transmits the packet received by the first port, a counter value providing part that provides a value of the counter to the packet received by the first port if the packet is a packet for time synchronization, and a delay value providing part that calculates a difference between the value provided to the packet transmitted from the second port by the counter value providing part and the value of the counter and that provides the calculated difference to the packet, the difference serving as a delay value, if the packet is a packet for time synchronization.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of a time synchronization method and a relay apparatus disclosed in the present application will now be described in detail with reference to the drawings. Although an example of using a PTP as a protocol for time synchronization will be described in the following embodiments, the technique disclosed in the present application is also effective when other protocols are used for time synchronization.

First Embodiment

Figure 1:
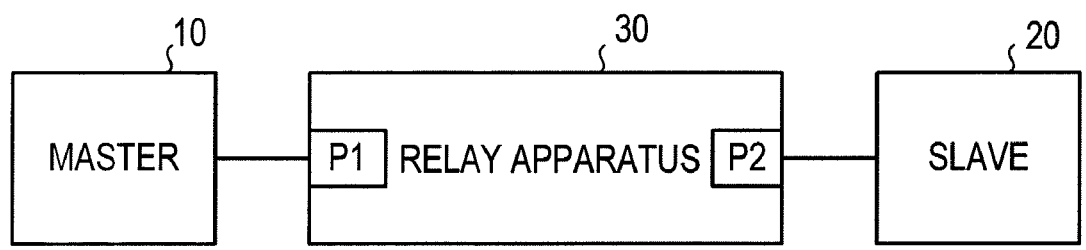
FIG. 1 is a configuration of a time synchronization system according to a first embodiment.

A time synchronization method according to the present embodiment will be described first. FIG. 1 is a configuration of a time synchronization system according to the present embodiment. As illustrated in FIG. 1, the time synchronization system according to the present embodiment forms a network connection of a master 10 and a slave 20 through a relay apparatus 30.

The master 10 is a device that manages a reference time, and the slave 20 is a device that synchronizes the time of the slave 20 to the time of the master 10. The relay apparatus 30 is a device that relays communications, and is, for example, a switching hub or a layer 3 switch. The relay apparatus 30 is connected to the master 10 through a port P1 and connected to the slave 20 through a port P2.

The relay apparatus 30 includes a counter (not illustrated). The counter is counted up every certain time (for example, every 1 μsecond). When the port P1 receives a PTP packet, the relay apparatus 30 adds a value of the counter to the packet. When outputting the packet from the port P2 after completion of packet buffering, the relay apparatus 30 calculates the difference between the latest value of the counter and the value provided to the packet upon the reception and adds the difference to the packet as a delay value in the relay apparatus 30.

When the port P2 receives a PTP packet, the relay apparatus 30 adds a value of the counter to the packet. When outputting the packet from the port P1 after completion of packet buffering, the relay apparatus 30 calculates a difference between the latest value of the counter and the value provided to the packet upon the reception and adds the difference to the packet as a delay value in the relay apparatus 30.

In this way, after receiving a PTP packet, the relay apparatus 30 provides a value to the packet, the value indicating the length of time from the reception to the output of the packet by the relay apparatus 30. Based on the value provided to the packet by the relay apparatus 30, the master 10 and the slave 20 adjust the time information to account for the delay in the relay apparatus 30 and execute a process for time synchronization.

Figure 2:
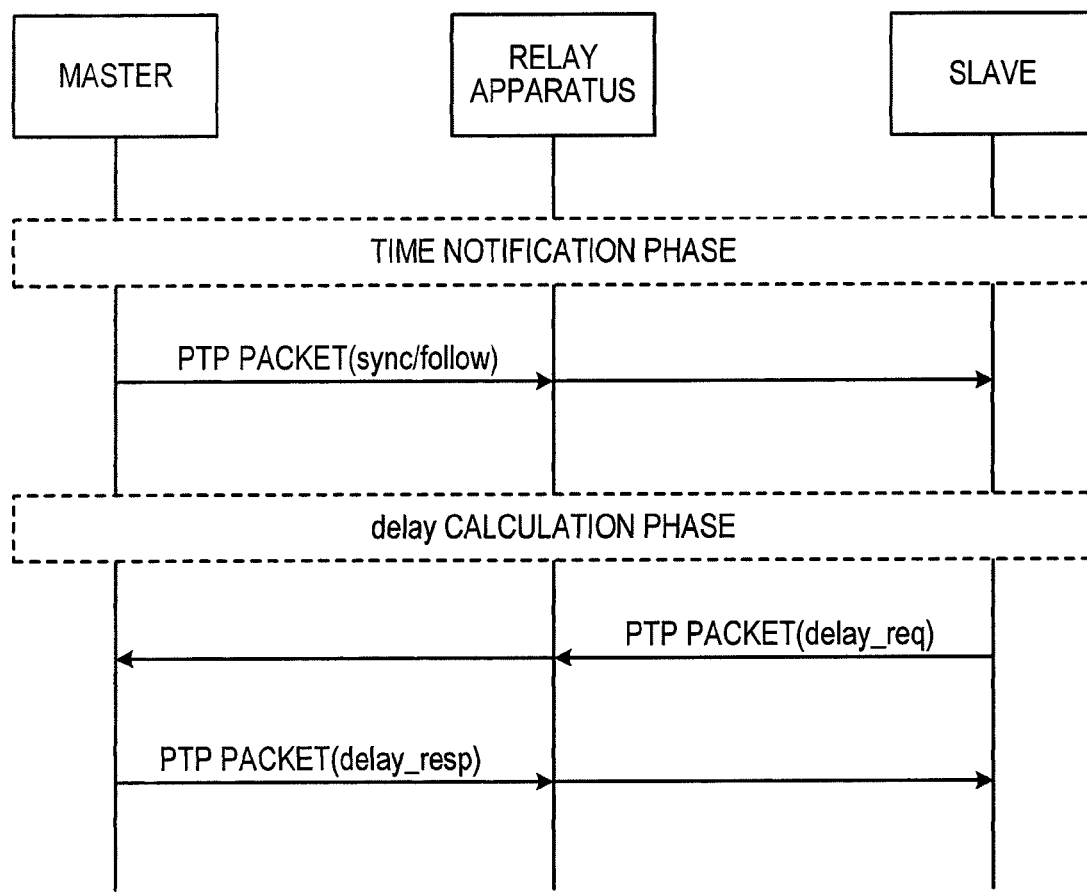
FIG. 2 is a schematic diagram of an operation of the time synchronization system according to the first embodiment.

FIG. 2 depicts an operation of the time synchronization system according to the present embodiment. As illustrated in FIG. 2, the slave and the master adjust the time information to account for the delay in the relay apparatus 30 and execute a process for time synchronization to thereby appropriately function the time synchronization in the same way as when the transmission delays of packets are the same.

Configurations of the devices illustrated in FIG. 1 are described with reference to the drawings. Parts related to the time synchronization method according to the present embodiment is described in the following description.

Figure 3:
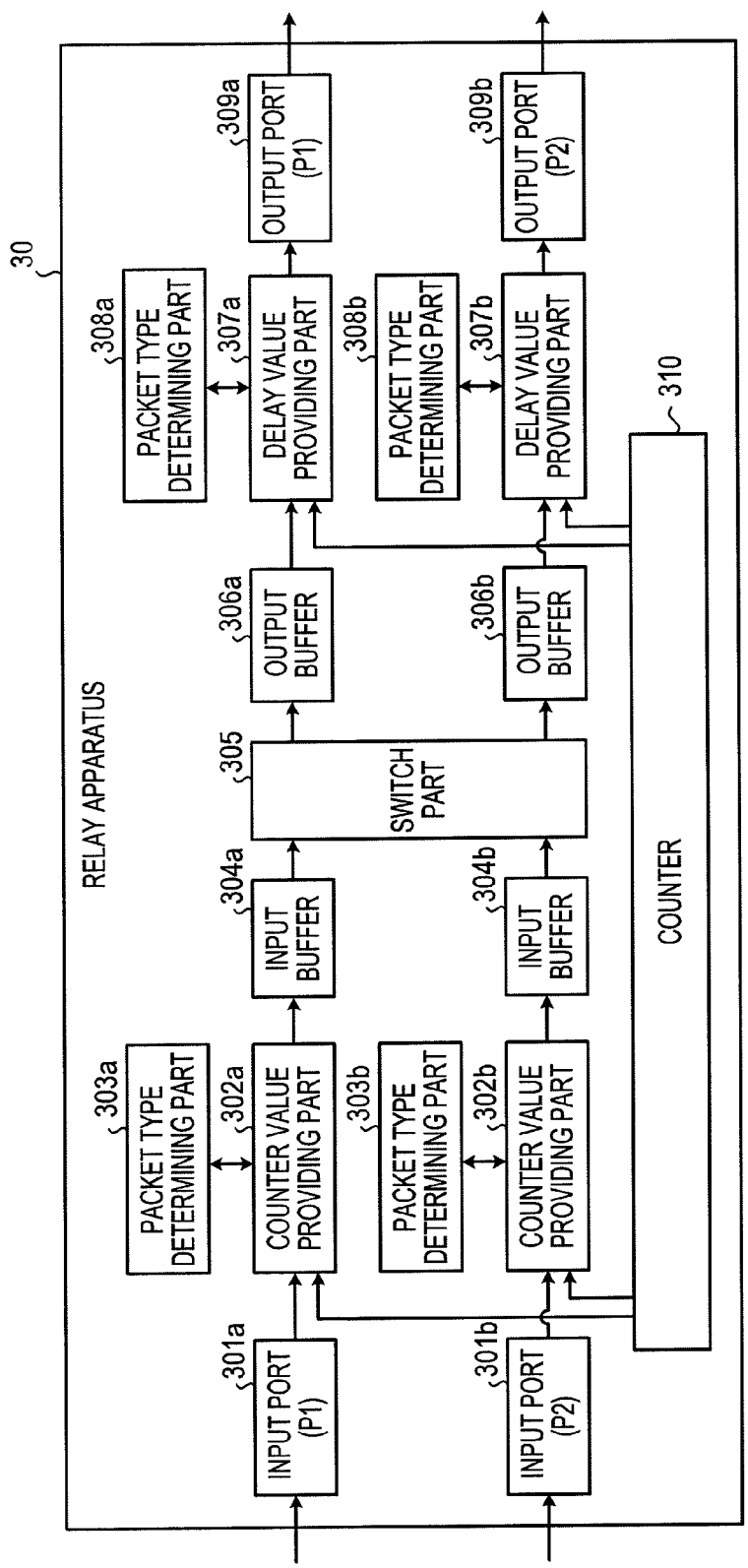
FIG. 3 is a block diagram of a configuration of a relay apparatus according to the first embodiment.

FIG. 3 is a block diagram of a configuration of the relay apparatus 30 illustrated in FIG. 1. Although the relay apparatus 30 includes only the ports P1 and P2 in FIG. 3, the relay apparatus 30 may include three or more ports.

As illustrated in FIG. 3, the relay apparatus 30 includes input ports 301a and 301b, counter value providing parts 302a and 302b, packet type determining parts 303a and 303b, input buffers 304a and 304b, a switch part 305, output buffers 306a and 306b, delay value providing parts 307a and 307b, packet type determining parts 308a and 308b, output ports 309a and 309b, and a counter 310.

The input ports 301a and 301b are processing parts that receive packets from the outside, and the output ports 309a and 309b are processing parts that transmit packets to the outside. A combination of the input port 301a and the output port 309a is equivalent to the port P1 illustrated in FIG. 1, and a combination of the input port 301b and the output port 309b is equivalent to the port P2 illustrated in FIG. 1.

The counter value providing part 302a causes the packet type determining part 303a to determine whether a packet received by the input port 301a is for time synchronization. If the packet type determining part 303a determines that the packet is for time synchronization, the counter value providing part 302a provides a value of the counter 310 to the packet, the value serving as a counter value, and outputs the packet provided with the value to the input buffer 304a. The counter value may be provided by adding a new item to the end, etc., of the packet, or an unused item in the packet may be used. On the other hand, if the packet type determining part 303a determines that the packet is not for time synchronization, the counter value providing part 302a outputs the packet to the input buffer 304a without providing the counter value.

Based on a value of an item of the header of the packet, etc., the packet type determining part 303a determines whether the packet is for time synchronization. The input buffer 304a buffers the packet and outputs the packet to the switch part 305 at certain timings. Based on route control information, etc., the switch part 305 outputs the packet to one of the output buffers 306a and 306b. The output buffer 306a buffers the packet and outputs the packet to the delay value providing part 307a at certain timings.

The delay value providing part 307a causes the packet type determining part 308a to determine whether or not the packet outputted from the output buffer 306a is for time synchronization. If the packet type determining part 308a determines that the packet is for time synchronization, the delay value providing part 307a calculates a difference between the value of the counter 310 and the counter value previously provided to the packet. The delay value providing part 307a then removes the counter value previously provided to the packet and provides the calculated difference to the packet, the difference serving as a delay value. The delay value may be provided by adding a new item to the end, etc., of the packet, or an unused item in the packet may be used.

To avoid the data from being determined corrupted during the transmission, the delay value providing part 307a further updates the checksum of the packet and outputs the packet to the output port 309a. The calculation may be performed for the entire packet to update the checksum, or the calculation may be performed only for the parts provided with the delay value to update the difference in order to reduce the calculation time and the processing load for calculation. The delay value providing part 307a may skip updating the checksum if it is recognized in advance that downstream devices will not examine the checksum of the packet. On the other hand, if the packet type determining part 308a determines that the packet is not for time synchronization, the delay value providing part 307a outputs the packet to the output port 309a without providing the delay value.

The counter 310 counts up the holding value every certain time. In the present embodiment, the unit of time that the counter 310 counts up the holding value and the unit of time set as time information to the packet for time synchronization are the same.

The counter value providing part 302b, the packet type determining part 303b, the input buffer 304b, the output buffer 306b, the delay value providing part 307b, and the packet type determining part 308b are parts equivalent to the counter value providing part 302a, the packet type determining part 303a, the input buffer 304a, the output buffer 306a, the delay value providing part 307a, and the packet type determining part 308a, respectively. Therefore the description will not be repeated.

Figure 4:
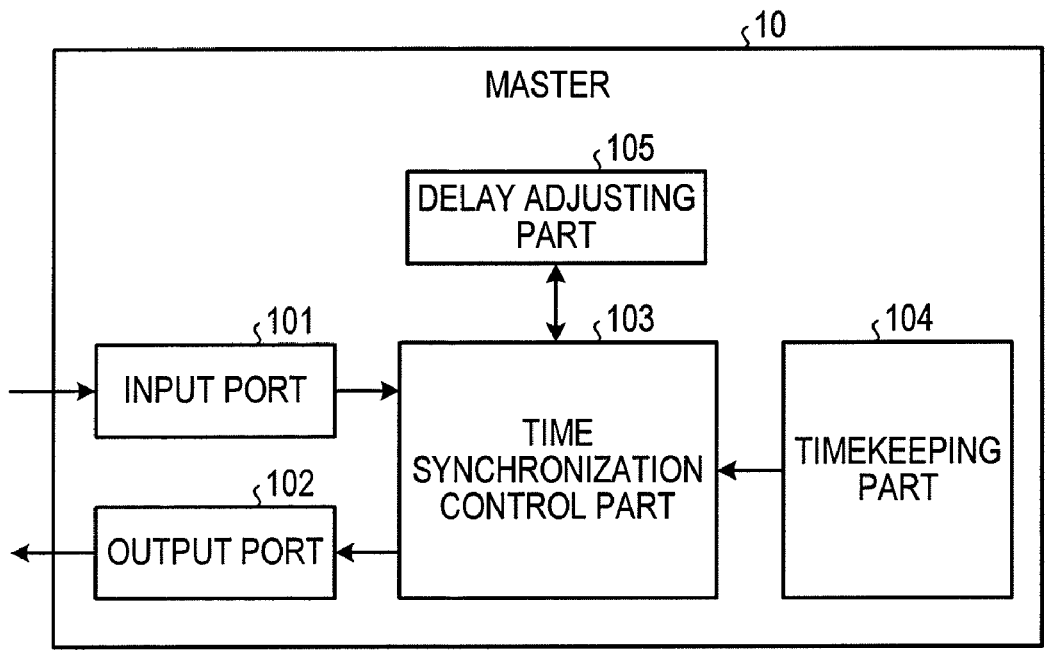
FIG. 4 is a block diagram of a configuration of a master according to the first embodiment.

FIG. 4 is a block diagram of a configuration of the master 10 illustrated in FIG. 1. As illustrated in FIG. 4, the master 10 includes an input port 101, an output port 102, a time synchronization control part 103, a timekeeping part 104, and a delay adjusting part 105. The input port 101 is a processing part that receives packets from the outside, and the output port 102 is a processing part that transmits packets to the outside.

The time synchronization control part 103 controls various processes for time synchronization. Specifically, based on the PTP, the time synchronization control part 103 creates and analyzes packets for time synchronization. The timekeeping part 104 keeps the reference time of time synchronization. Based on the delay value provided by the relay apparatus 30, the delay adjusting part 105 adjusts the time information to account for the delay in the relay apparatus 30.

Figure 5:
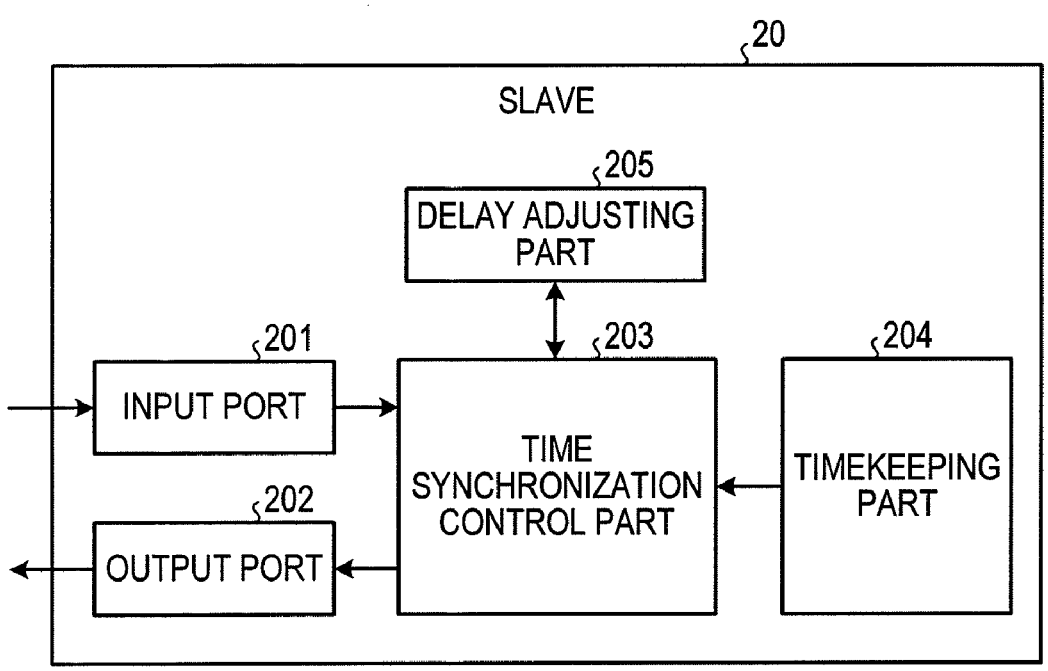
FIG. 5 is a functional block diagram of a configuration of a slave according to the first embodiment.

FIG. 5 is a block diagram of a configuration of the slave 20 illustrated in FIG. 1. As illustrated in FIG. 5, the slave 20 includes an input port 201, an output port 202, a time synchronization control part 203, a timekeeping part 204, and a delay adjusting part 205. The input port 201 is a processing part that receives packets from the outside, and the output port 202 is a processing part that transmits packets to the outside.

The time synchronization control part 203 controls various processes for time synchronization. Specifically, based on the PTP, the time synchronization control part 203 creates and analyzes packets for time synchronization. The time synchronization control part 203 also updates the time of the timekeeping part 204 based on the time information set to the packets for time synchronization. The timekeeping part 204 keeps the time. Based on the delay value provided by the relay apparatus 30, the delay adjusting part 205 adjusts the time information to account for the delay in the relay apparatus 30.

Figure 6:
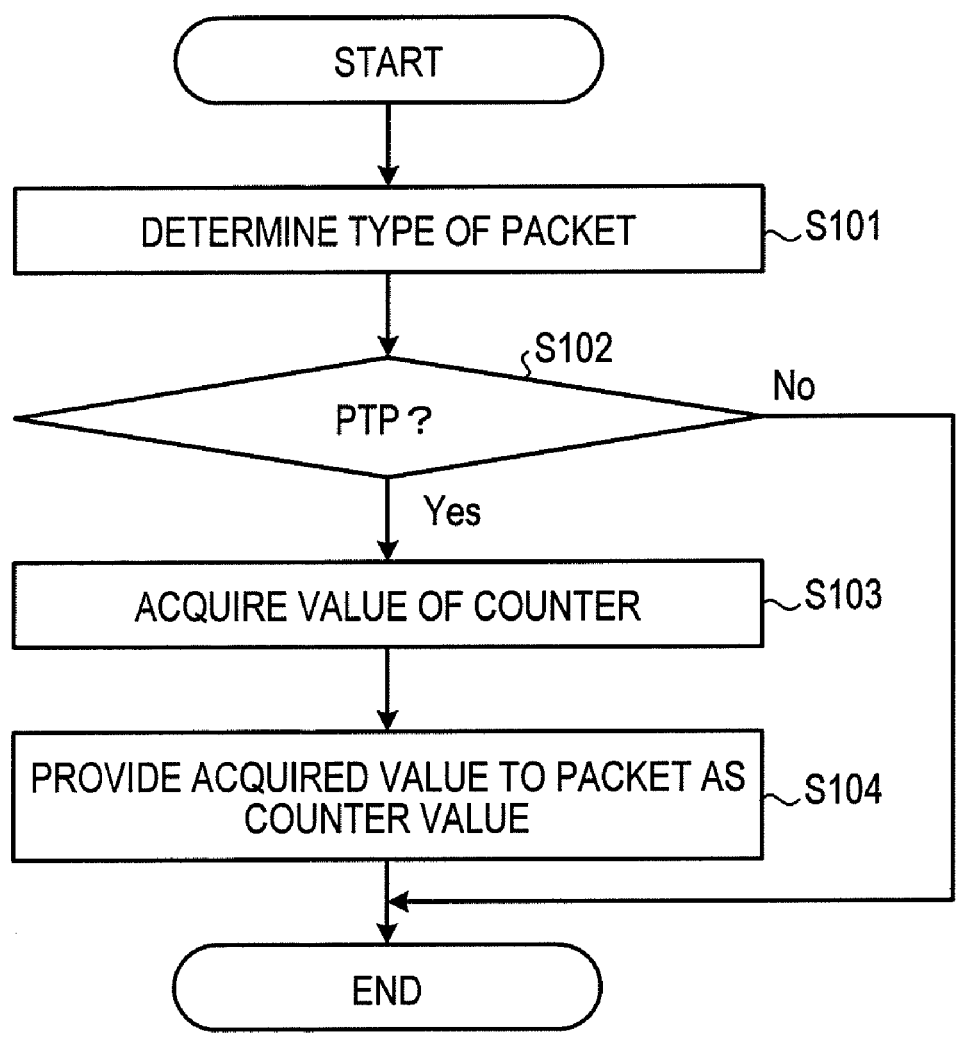
FIG. 6 is a flow chart of a procedure of a counter value providing part.

A procedure of the relay apparatus 30 illustrated in FIG. 3 will now be described. FIG. 6 is a flow chart of a procedure of the counter value providing part 302a. As illustrated in FIG. 6, the counter value providing part 302a causes the packet type determining part 303a to determine the type of a received packet (step S101).

If the type of the packet is related to the PTP, i.e., related to time synchronization (Yes in step S102), the counter value providing part 302a acquires the value of the counter 310 (step S103) and provides the acquired value to the packet, the value serving as a counter value (step S104). On the other hand, if the type of the packet is not related to the PTP, i.e., not related to time synchronization (No in step S102), the counter value providing part 302a does not provide the counter value to the packet.

Figure 7:
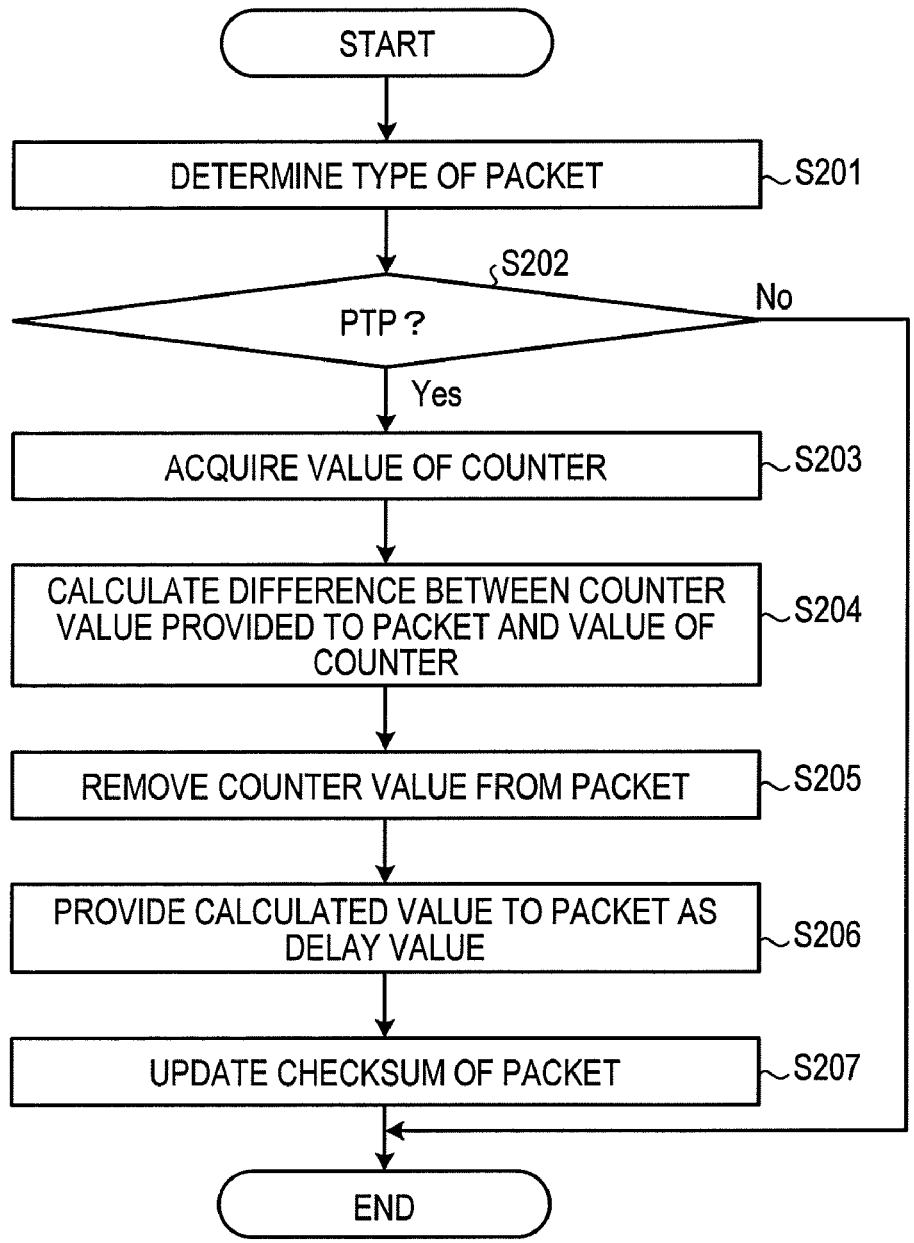
FIG. 7 is a flow chart of a procedure of a delay value providing part.

FIG. 7 is a flow chart of a procedure of the delay value providing part 307a. As illustrated in FIG. 7, the delay value providing part 307a causes the packet type determining part 308a to determine the type of the packet outputted from the output buffer 306a (step S201).

If the type of the packet is related to the PTP, i.e., related to time synchronization (Yes in step S202), the delay value providing part 307a acquires the value of the counter 310 (step S203). The delay value providing part 307a calculates the difference between the counter value previously provided to the packet and the value acquired from the counter 310

(step S204). The delay value providing part 307*a* then removes the counter value from the packet (step S205), provides the value calculated in step S204 to the packet, the value serving as a delay value (step S206), and updates the checksum of the packet (step S207). On the other hand, if the type of the packet is not related to the PTP, i.e., not related to time synchronization (No in step S202), the delay value providing part 307*a* does not provide the delay value to the packet.

Figure 13:
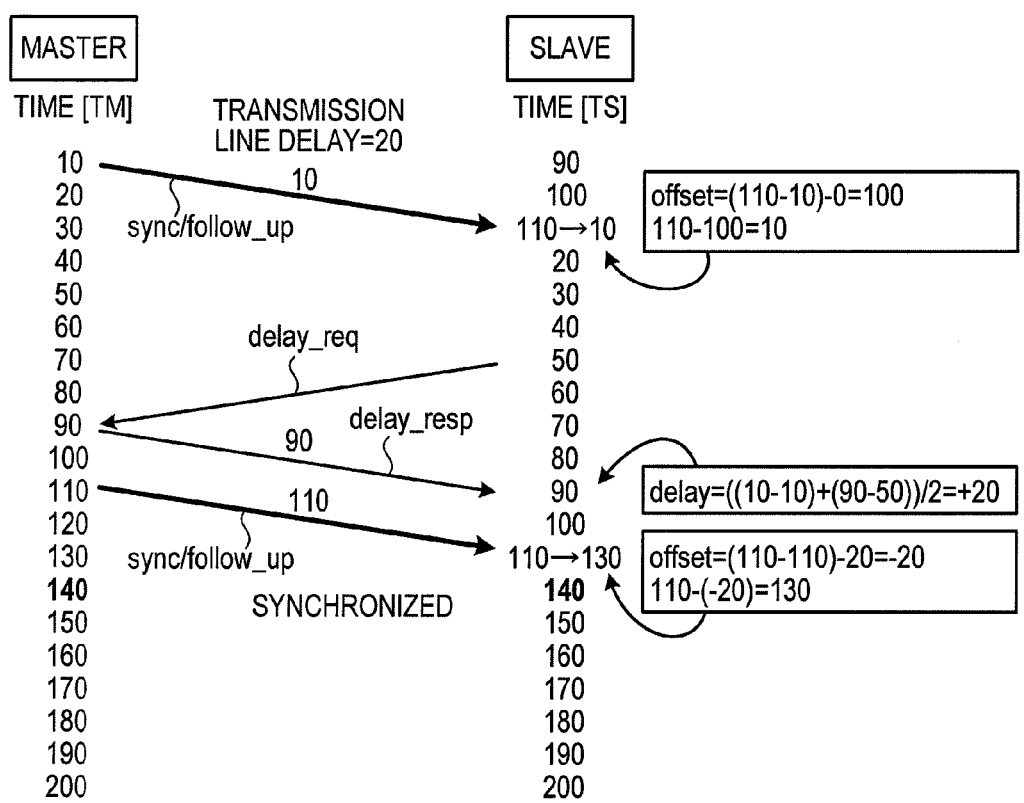
FIG. 13 is an example of time synchronization according to a conventional time synchronization method.
Figure 14:
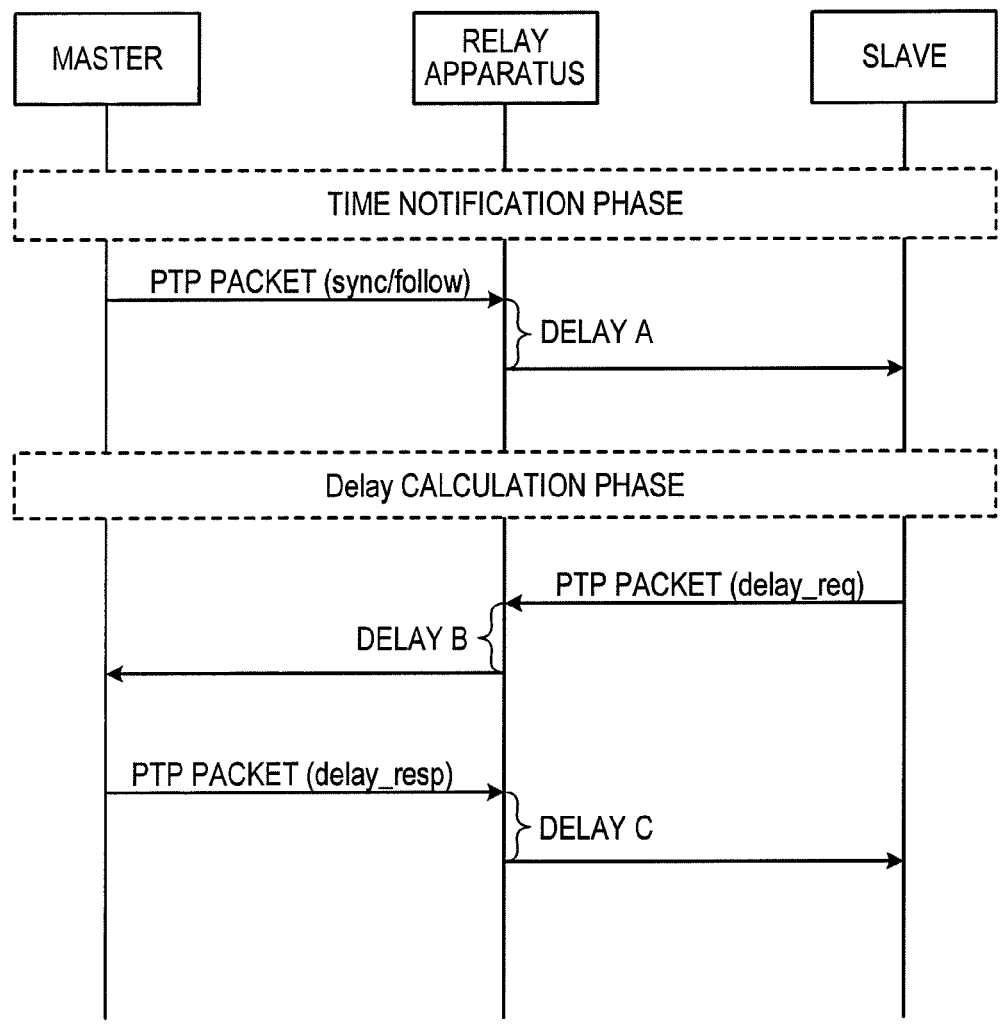
FIG. 14 is an example of an ideal communication environment.
Figure 15:
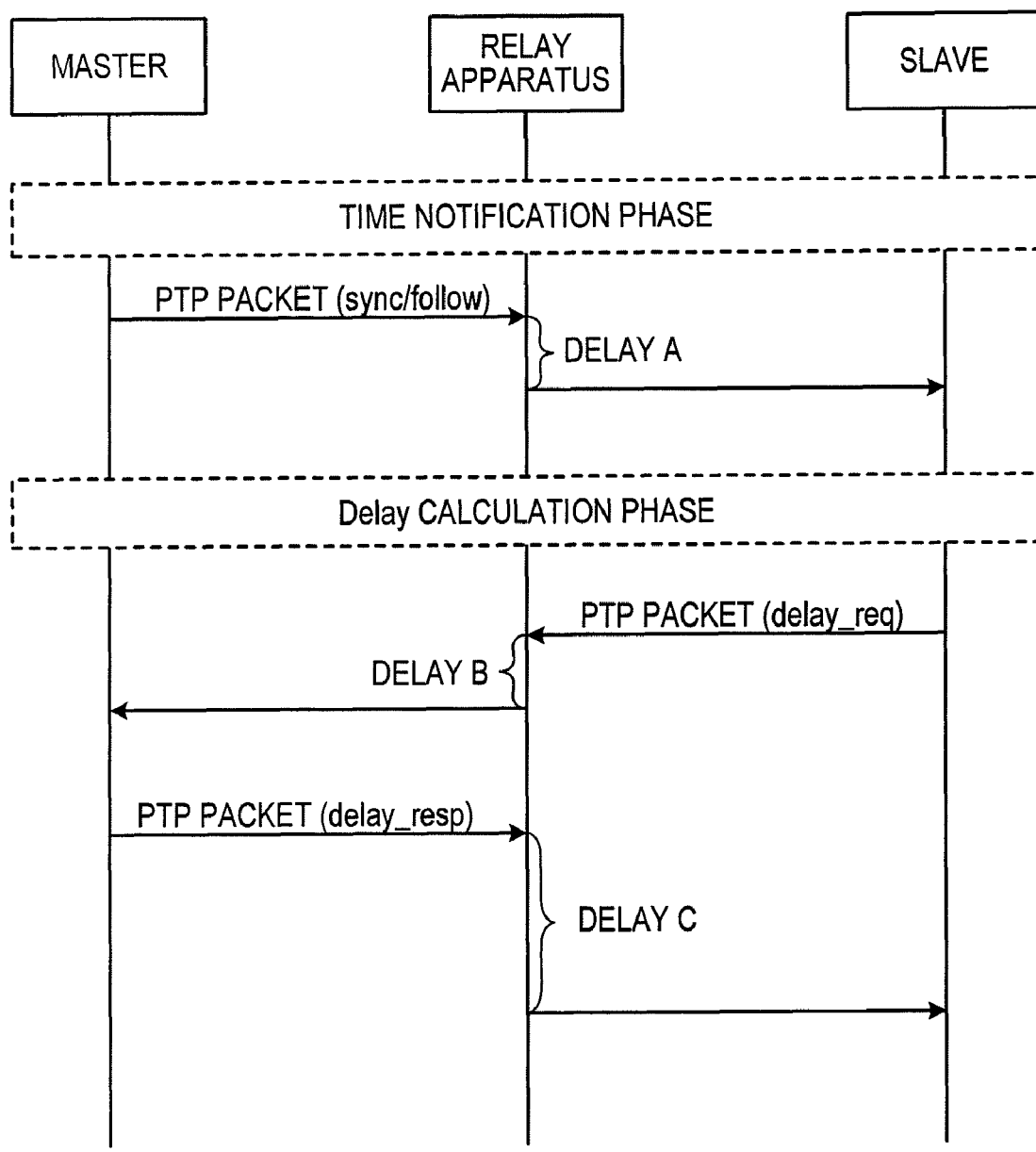
FIG. 15 is an example of a communication environment in which transmission times of packets do not match.
Figure 16:
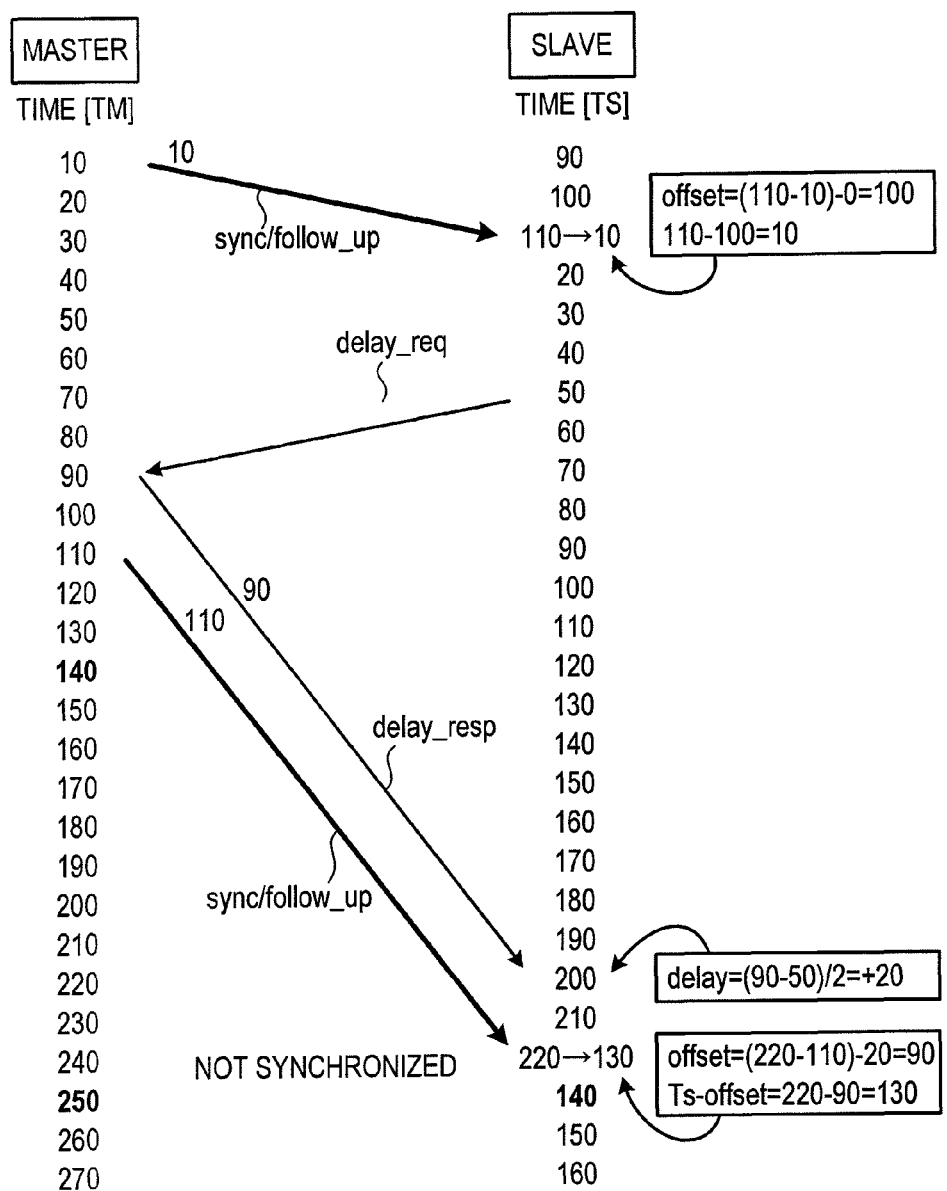
FIG. 16 is an example of a failure of time synchronization.

A specific example of time synchronization in the time synchronization system according to the present invention will now be described. In the following description, the parts already described with reference to FIG. 13 and other drawings will not be repeated.

Figure 8:
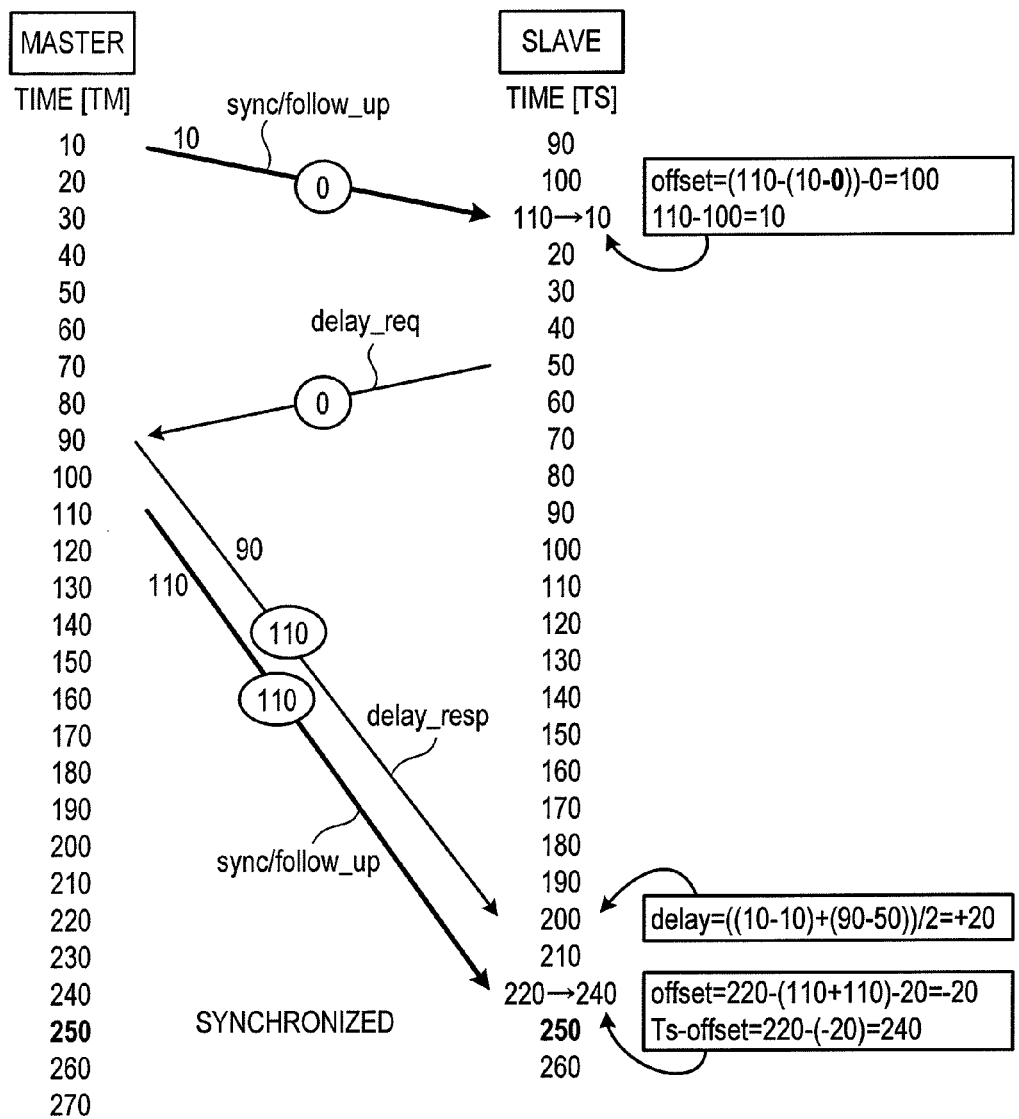
FIG. 8 is an example of time synchronization in the time synchronization system according to the first embodiment.

FIG. 8 is an example of time synchronization in the time synchronization system according to the present embodiment. As illustrated in FIG. 8, the master 10 uses a sync/follow_up message to notify the time of the master 10 to the slave 20. It is assumed that the delay time in the relay apparatus 30 is "0" when the messages are relayed. After receiving the sync/follow_up message, the slave 20 sets Time calculated by the following Expressions 4 and 5 as the time of the slave 20.

$$\text{offset} = TSx - (TMx + \text{syncdelay}) - \text{delay} \quad \text{Expression 4}$$

$$\text{Time} = Ts - \text{offset} \quad \text{Expression 5}$$

In this case, syncdelay denotes a delay time caused by buffering in the relay apparatus 30 when the sync/follow_up message is relayed, and syncdelay is provided to the packet as a delay value.

In the example of FIG. 8, the time of the master 10 notified by the sync/follow_up message is "10", the time of the slave 20 upon the notification is "110", and the delay time caused by buffering is "0". Therefore, the time of the slave 20 is set to "10" at this point.

Subsequently, the slave 20 transmits a delay_req message to the master 10 to acquire the size of the transmission line delay between the master 10 and the slave 20. It is assumed that the delay time in the relay apparatus 30 is "0" when the delay_req message is relayed. After receiving the delay_req message, the master 10 returns a delay_resp message to the slave 20, the delay_resp message including Time_r, which is a time in which the reception time of the delay_req message is adjusted by the delay value set to the packet as in the following Expression 6.

$$\text{Time}\_r = TMr - \text{reqdelay} \quad \text{Expression 6}$$

In this case, TMr denotes the reception time of the delay_req message in the master 10, and reqdelay denotes the delay time caused by buffering in the relay apparatus 30 when the delay_req message is relayed. The delay time reqdelay is provided to the packet as a delay value.

In the example of FIG. 8, the reception time of the delay_req message in the master 10 is "90", and reqdelay is "0". Therefore, the master 10 sets time information "90" to the delay_resp message.

After receiving the delay_resp message, the slave 20 sets a transmission line delay by the following Expression 7.

$$\text{delay} = ((TSx - (TMx + \text{syncdelay})) + (TMy - TSy))/2 \quad \text{Expression 7}$$

In the example of FIG. 8, the time that the slave 20 has transmitted the delay_req message to the master 10 is "50", the time included in the delay_resp message received by the slave 20 is "90", and syncdelay is "0" at this point. Therefore, the slave 20 sets delay to "20".

After transmitting the delay_resp, the master 10 uses a sync/follow_up message to notify the time of the master 10 to the slave 20 again. It is assumed that the delay time in the relay apparatus 30 is "110" when the message is relayed. After receiving the sync/follow_up message, the slave 20 sets Time calculated by Expressions 4 and 5 as the time of the slave 20.

In the example of FIG. 8, the time of the master 10 notified by the second sync/follow_up message is "110", and the time of the slave 20 upon the notification is "220". The delay value added by the relay apparatus 30 is "110", and the value of delay is "20" at this point. Therefore, the time of the slave 20 is set to "240" at this point. After that point, the times of the master 10 and the slave 20 are synchronized as illustrated in FIG. 8.

Figure 9:
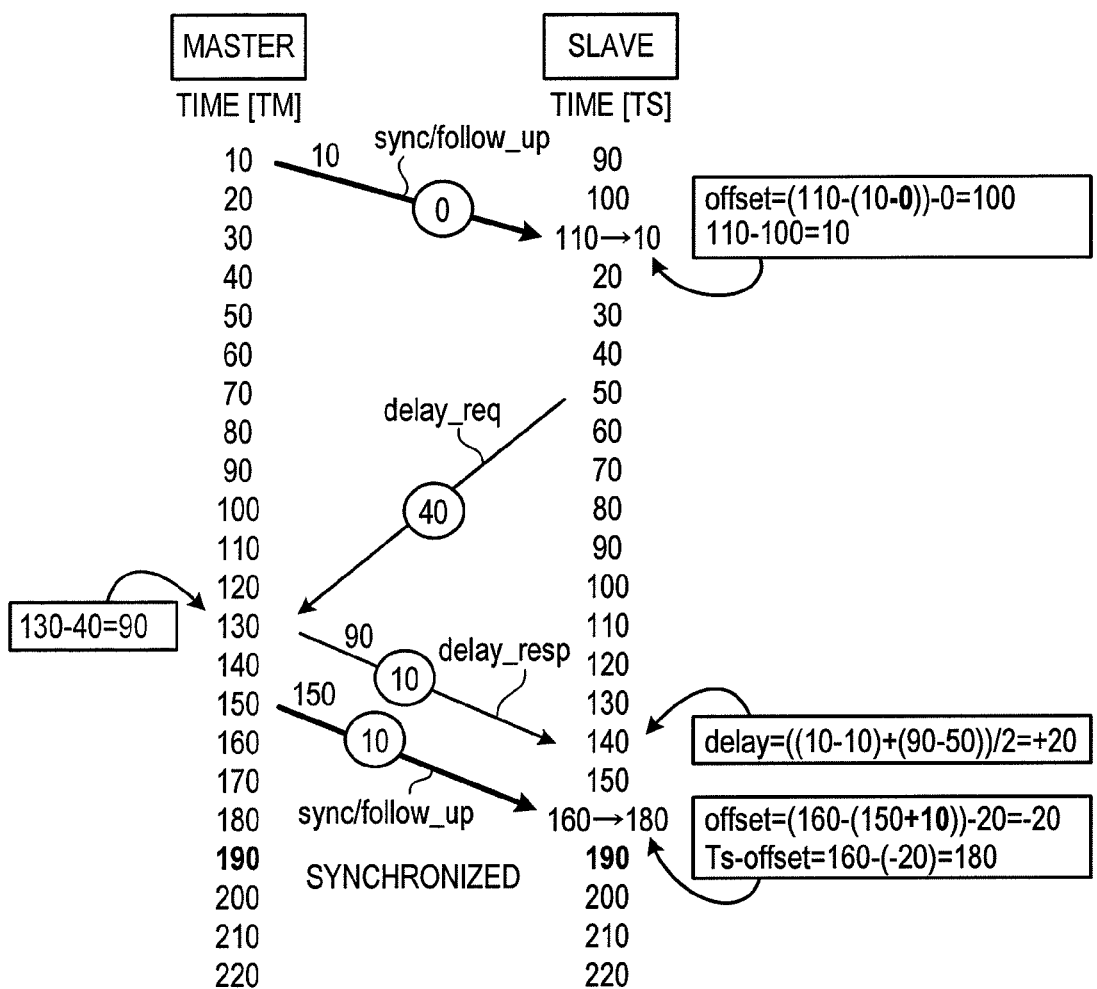
FIG. 9 is another example of time synchronization in the time synchronization system according to the first embodiment.

FIG. 9 is another example of time synchronization in the time synchronization system according to the present embodiment. As illustrated in FIG. 9, the master 10 uses a sync/follow_up message to notify the time of the master 10 to the slave 20. It is assumed that the delay time in the relay apparatus 30 is "0" when the messages are relayed. After receiving the sync/follow_up message, the slave 20 sets Time calculated by Expressions 4 and 5 as the time of the slave 20.

In the example of FIG. 9, the time of the master 10 notified by the sync/follow_up message is "10", the time of the slave 20 upon the notification is "110", and the delay time caused by buffering is "0". Therefore, the slave 20 sets the time to "10" at this point.

Subsequently, the slave 20 transmits a delay_req message to the master 10 to acquire the size of the transmission line delay between the master 10 and the slave 20. It is assumed that the delay time in the relay apparatus 30 is "40" when the delay_req message is relayed. After receiving the delay_req message, the master 10 returns a delay_resp message to the slave 20, the delay_resp message including Time_r, which is a time in which the reception time of the delay_req message is adjusted by the delay value set to the packet as in Expression 6.

In the example of FIG. 9, the reception time of the delay_req message in the master 10 is "130", and reqdelay is "40". Therefore, the master 10 sets time information "90" to the delay_resp message.

After receiving the delay_resp message, the slave 20 sets a transmission line delay by Expression 7.

In the example of FIG. 9, the time that the slave 20 has transmitted the delay_req message to the master 10 is "50", the time included in the delay_resp message received by the slave 20 is "90", and syncdelay is "0" at this point. Therefore, the slave 20 sets delay to "20".

After transmitting the delay_resp message, the master 10 uses a sync/follow_up message to notify the time of the master 10 to the slave 20 again. It is assumed that the delay time in the relay apparatus 30 is "10" when the messages are relayed. After receiving the sync/follow_up message, the slave 20 sets Time calculated by Expressions 4 and 5 as the time of the slave 20.

In the example of FIG. 9, the time of the master 10 notified by the second sync/follow_up message is "150", and the time of the slave 20 upon the notification is "160". The delay value added by the relay apparatus 30 is "10", and the value of delay is "20" at this point. Therefore, the time of the slave 20 is set to "180" at this point. After that point, the times of the master 10 and the slave 20 are synchronized as illustrated in FIG. 9.

Figure 10:
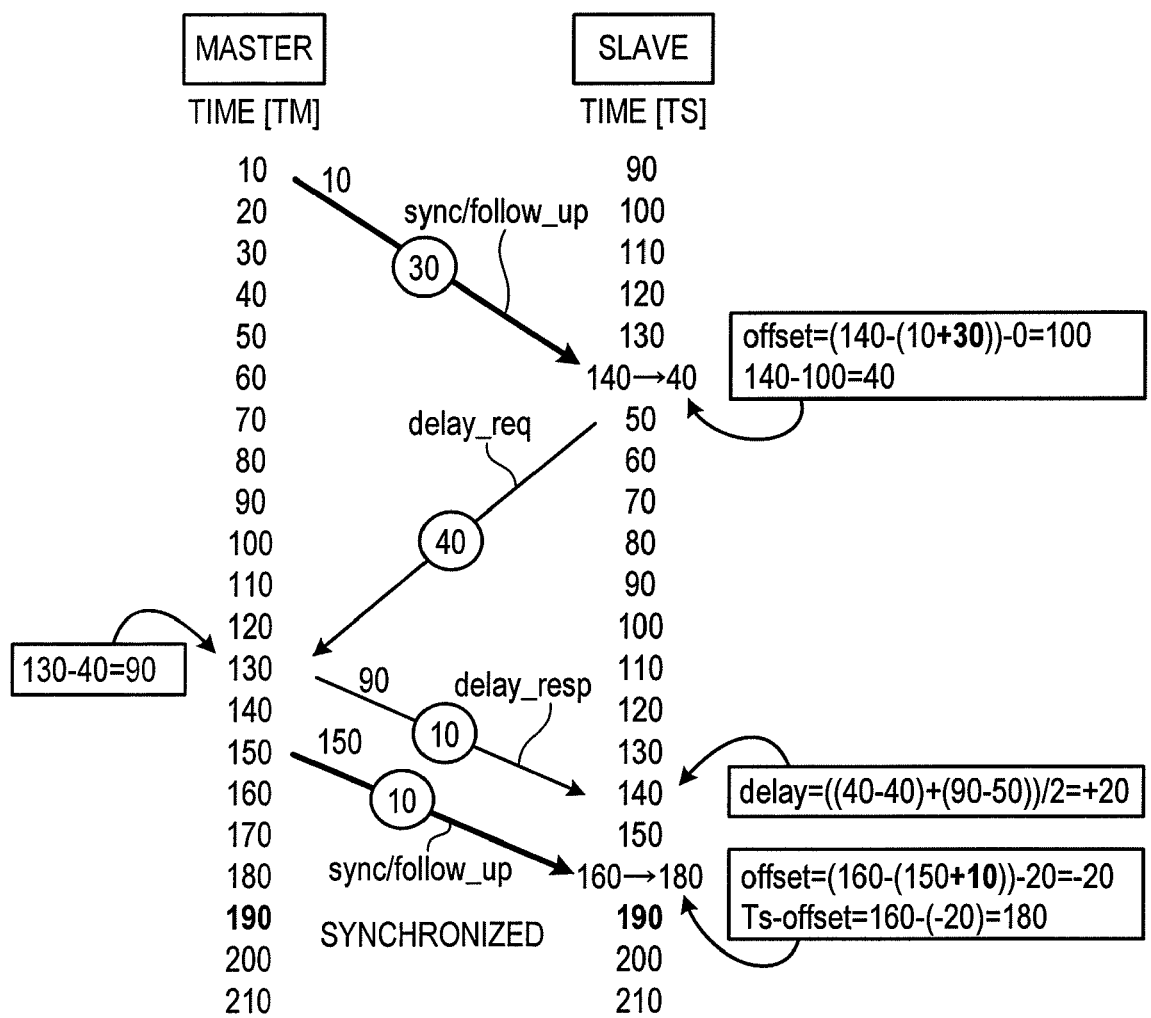
FIG. 10 is another example of time synchronization in the time synchronization system according to the first embodiment.

FIG. 10 is another example of time synchronization in the time synchronization system according to the present embodiment. As illustrated in FIG. 10, the master 10 uses a sync/follow_up message to notify the time of the master 10 to the slave 20. It is assumed that the delay time in the relay apparatus 30 is "30" when the messages are relayed. After receiving the sync/follow_up message, the slave 20 sets Time calculated by Expressions 4 and 5 as the time of the slave 20.

In the example of FIG. 10, the time of the master 10 notified by the sync/follow_up message is "10", the time of the slave 20 upon the notification is "140", and the delay time caused by buffering is "30". Therefore, the slave 20 sets the time to "40" at this point.

Subsequently, the slave 20 transmits a delay_req message to the master 10 to acquire the size of the transmission line delay between the master 10 and the slave 20. It is assumed that the delay time in the relay apparatus 30 is "40" when the delay_req message is relayed. After receiving the delay_req message, the master 10 returns a delay_resp message to the slave 20, the delay_resp message including Time_r, which is a time in which the reception time of the delay_req message is adjusted by the delay value set to the packet as in Expression 6.

In the example of FIG. 10, the reception time of the delay_req message in the master 10 is "130", and reqdelay is "40". Therefore, the master 10 sets time information "90" to the delay_resp message.

After receiving the delay_resp message, the slave 20 sets a transmission line delay by Expression 7.

In the example of FIG. 10, the time that the slave 20 has transmitted the delay_req message to the master 10 is "50", the time included in the delay_resp message is "90", and syncdelay is "30" at this point. Therefore, the slave 20 sets delay to "20".

After transmitting the delay_resp message, the master 10 uses a sync/follow_up message to notify the time of the master 10 to the slave 20 again. It is assumed that the delay time in the relay apparatus 30 is "10" when the messages are relayed. After receiving the sync/follow_up message, the slave 20 sets Time calculated by Expressions 4 and 5 as the time of the slave 20.

In the example of FIG. 10, the time of the master 10 notified by the second sync/follow_up message is "150", and the time of the slave 20 upon the notification is "160". The delay value added by the relay apparatus 30 is "10", and the value of delay is "20" at this point. Therefore, the time of the slave 20 is set to "180" at this point. After that point, the times of the master 10 and the slave 20 are synchronized as illustrated in FIG. 10.

As described, the size of the delay that occurs when the packet passes through the relay apparatus is provided to the packet in the first embodiment. Therefore, the time synchronization can be realized by taking the value into consideration even if the transmission time of packet changes.

Second Embodiment

The first embodiment has illustrated an example of the switching hub, etc., providing a delay value to the packet, the delay value indicating the size of the internal delay. However, an addition of such a function to the switching hub, etc., may not be possible in a network already in operation. Thus, the present embodiment describes a technique that can realize time synchronization even if a function for providing a delay value to the packet cannot be added to the switching hub, etc.

In the following description, the same portions as the already described portions are designated with the same reference numerals as the already described portions, and the overlapping descriptions will not be repeated.

Figure 11:
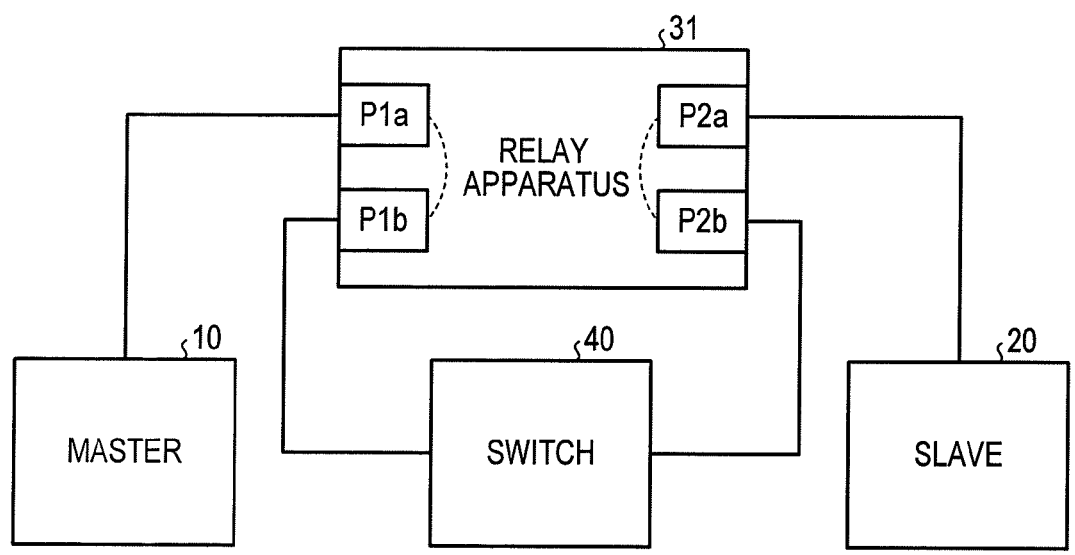
FIG. 11 is a configuration of a time synchronization system according to a second embodiment.

FIG. 11 is a configuration of a time synchronization system according to the present embodiment. As illustrated in FIG. 11, the time synchronization system according to the present embodiment forms a network connection between the master 10 and the slave 20 through a relay apparatus 31 and a switch 40.

The switch 40 is a switching hub without a function of providing a delay value to the packet. The switch 40 may be any device as long as there is a possibility of causing a jitter to the transmission time of packet.

The relay apparatus 31 is connected to the master 10 through a port P1a, connected to one of the ports of the switch 40 through a port P1b, connected to another port of the switch 40 through a port P2b, and connected to the slave 20 through a port P2a. The port P1a and the port P1b are connected inside the relay apparatus 31, and the port P2a and the port P2b are connected inside the relay apparatus 31. Therefore, the master 10, the slave 20, the relay apparatus 31, and the switch 40 are connected in the route of the master 10, the port P1a of the relay apparatus 31, the port P1b of the relay apparatus 31, the switch 40, the port P2b of the relay apparatus 31, the port P2a of the relay apparatus 31, and the slave 20.

The relay apparatus 31 includes a counter not illustrated. The counter is counted up every certain time (for example, every 1 μsecond). When the port P1a receives a PTP packet, the relay apparatus 31 adds the value of the counter to the packet. When the packet is outputted from the port P2a through the switch 40, the relay apparatus 31 calculates the difference between the latest value of the counter and the value provided to the packet upon the reception by the port P1a and adds the difference to the packet, the difference serving as a delay value.

When the port P2a receives the PTP packet, the relay apparatus 31 adds the value of the counter to the packet. When the packet is outputted from the port P1a through the switch 40, the relay apparatus 31 calculates the difference between the latest value of the counter and the value provided to the packet upon the reception by the port P2a and adds the difference to the packet, the difference serving as a delay value.

Thus, after receiving the PTP packet, the relay apparatus 31 provides a value to the packet, the value indicating the length of time from the packet passing through the switch 40 to the output from the relay apparatus 31. Based on the value provided to the packet by the relay apparatus 31, the master 10 and the slave 20 adjust the time information to account for the delay in the relay apparatus 31 and the switch 40 to execute a process for time synchronization. Such a configuration can eliminate the influence of a jitter of transmission time in the switch 40 and execute time synchronization.

Figure 12:
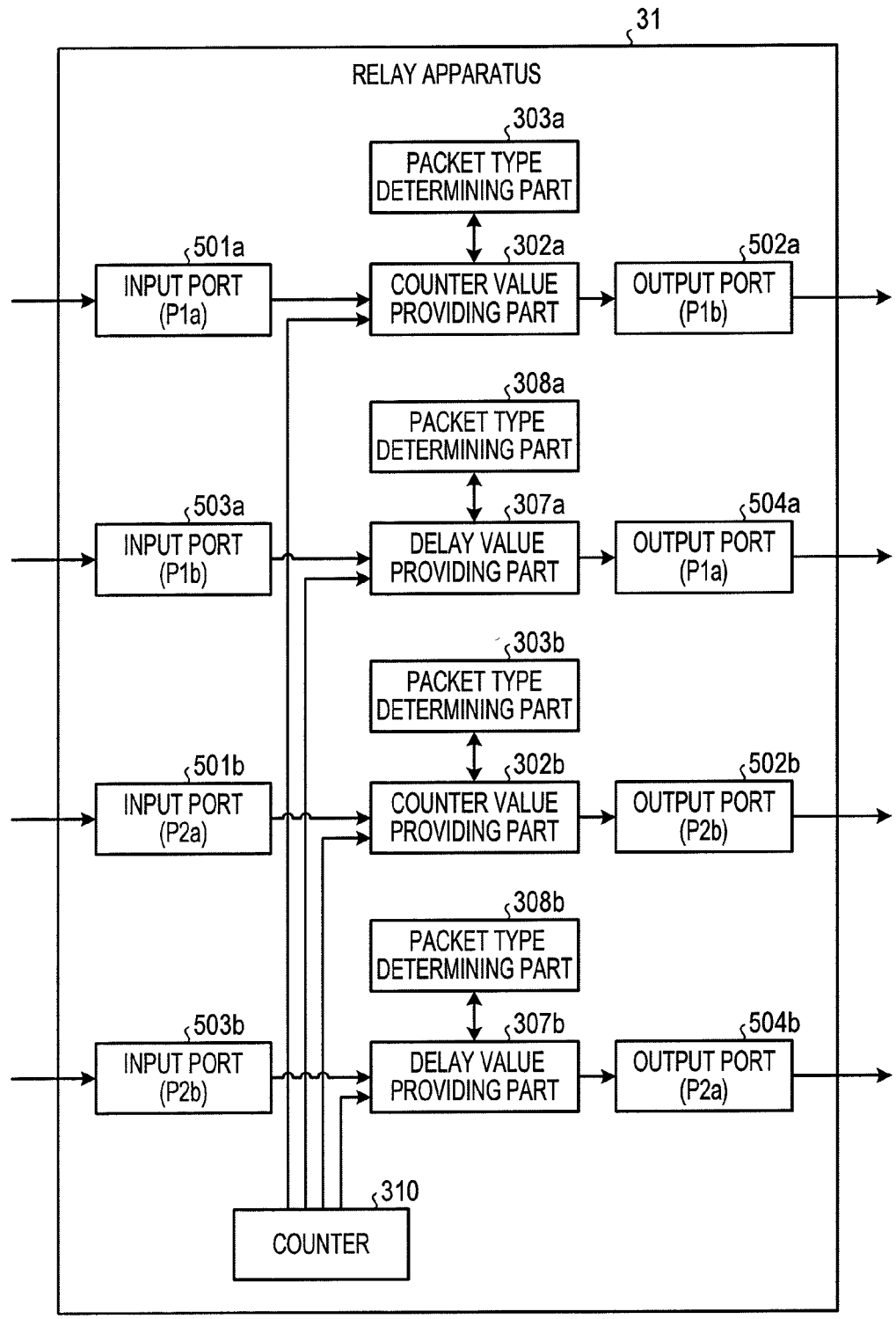
FIG. 12 is a block diagram of a configuration of a relay apparatus according to the second embodiment.

A configuration of the relay apparatus 31 illustrated in FIG. 11 will now be described. FIG. 12 is a block diagram of a configuration of the relay apparatus 31. As illustrated in FIG. 12, the relay apparatus 31 includes input ports 501a and 501b, counter value providing parts 302a and 302b, packet type determining parts 303a and 303b, output ports 502a and 502b, input ports 503a and 503b, delay value providing parts 307a and 307b, packet type determining parts 308a and 308b, output ports 504a and 504b, and a counter 310.

The input port 501a receives a packet transmitted from the master 10 and outputs the packet to the counter value providing part 302a. The output port 502a transmits the packet outputted from the counter value providing part 302a to the switch 40. The input port 503a receives the packet transmitted from the switch 40 and outputs the packet to the delay value providing part 307a. The output port 504a transmits the packet outputted from the delay value providing part 307a to the slave 20. A combination of the input port 501a and the output port 504a is equivalent to the port P1a illustrated in FIG. 11. A combination of the input port 503a and the output port 502a is equivalent to the port P1b illustrated in FIG. 11.

The input port 501b receives the packet transmitted from the slave 20 and outputs the packet to the counter value providing part 302b. The output port 502b transmits the packet outputted from the counter value providing part 302b to the switch 40. The input port 503b receives the packet transmitted from the switch 40 and outputs the packet to the delay value providing part 307b. The output port 504b transmits the packet outputted from the delay value providing part 307b to the master 10. A combination of the input port 501b and the output port 504b is equivalent to the port P2a illustrated in FIG. 11. A combination of the input port 503b and the output port 502b is equivalent to the port P2b illustrated in FIG. 11.

The functions and the processes of the counter value providing parts 302a and 302b, the packet type determining parts 303a and 303b, the output ports 502a and 502b, the delay value providing parts 307a and 307b, the packet type determining parts 308a and 308b, and the counter 310 are equivalent to those in the first embodiment. The packet to which the counter value providing parts 302a and 302b have provided the counter value passes through the switch 40. Therefore, if the switch 40 includes a function of examining the checksum of the packet, the counter value providing parts 302a and 302b update the checksum.

As described, the relay apparatus provides the size of the delay that occurs when the packet passes through the switching hub, etc., to the packet in the second embodiment. Therefore, the time synchronization can be realized by taking the value into consideration even if the transmission time of packet changes.

According to the embodiments of the present invention, the size of the delay that occurs during the transmission of a packet is provided to the packet. Therefore, the time synchronization can be realized by taking the value into consideration even if the transmission time of packet changes.

Applications of the constituent elements, expressions, or arbitrary combinations of the constituent elements of the relay apparatus used in the embodiments of the present invention to methods, apparatuses, systems, computer programs, recording media, data configurations, etc., are also effective to solve the problems.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A time synchronization method for synchronizing times of a first apparatus and a second apparatus, the time synchronization method comprising:
    transmitting, by the first apparatus, a packet to the second apparatus via a relay apparatus that relays the packet, the packet including the time of the first apparatus;
    receiving, by the relay apparatus, the packet;
    determining, by the relay apparatus, whether a type of the received packet is time synchronization between the first apparatus and the second apparatus;
    providing, by the relay apparatus, a value to the packet in case of determining that the type of the packet is time synchronization, the value indicating a reception time of the packet;
    providing, by the relay apparatus, a difference between the value provided to the packet in the providing of reception time and a current time to the packet upon a transmission of the packet in case of determining that the type of the packet is time synchronization, the difference serving as a delay value; and
    executing, by the second apparatus, a control for time synchronization based on the time of the first apparatus included in the packet and the delay value provided to the packet.

2. A relay apparatus that relays a packet from a first apparatus to a second apparatus, the relay apparatus comprising:
    a counter that adds a value every certain time;
    a first port that receives a packet from the first apparatus;
    a second port that transmits the packet received by the first port to the second apparatus;
    a packet type determining part that determines whether a type of the received packet is time synchronization between the first apparatus and the second apparatus;
    a counter value providing part that provides a value of the counter to the packet received by the first port in case of determining that the type of the packet is time synchronization; and
    a delay value providing part that calculates a difference between the value provided by the counter value providing part to the packet and a current value of the counter and that provides the calculated difference to the packet transmitted from the second port, the difference serving as a delay value, in case of determining that the type of the packet is time synchronization.

3. The relay apparatus according to claim 2, further comprising
    a third port that transmits the packet received by the first port to another apparatus; and
    a fourth port that receives the packet transmitted from the other apparatus, wherein
    the second port transmits the packet that is received by the first port and that has passed through the third port and the fourth port.

4. The relay apparatus according to claim 2, wherein the delay value providing part updates a checksum of the packet provided with the delay value.

5. The relay apparatus according to claim 3, wherein the counter value providing part updates a checksum of the packet provided with the value of the counter.

6. A relay method for by a relay apparatus that relays a packet from a first apparatus to a second apparatus, the relay method comprising:
    adding a value to a counter every certain time;
    receiving a packet from the first apparatus;
    determining whether a type of the received packet is time synchronization between the first apparatus and the second apparatus;
    providing a value of the counter to the received packet in case of determining that the type of the received packet is time synchronization;
    calculating a difference between the value provided to the received packet and a current value of the counter;
    providing the calculated difference to the received packet, the difference serving as a delay value, in case of determining that the type of the received packet is time synchronization; and
    transmitting the received packet to the second apparatus.

* * * * *